United States Patent [19]

Cox et al.

[11] Patent Number: 4,730,161

[45] Date of Patent: Mar. 8, 1988

[54] DUAL FREQUENCY WELL LOGGING SYSTEM FOR DETERMINING THE WATER RESISTIVITY AND WATER SATURATION OF AN EARTH FORMATION

[75] Inventors: Percy T. Cox; Jackie C. Sims; Richard S. Simpson, all of Houston, Tex.

[73] Assignee: Texaco Inc., White Plains, N.Y.

[21] Appl. No.: 910,043

[22] Filed: Sep. 22, 1986

[51] Int. Cl.$^4$ ............................ G01V 3/18; G01V 3/30
[52] U.S. Cl. ...................................... 324/338; 324/341
[58] Field of Search ............................. 324/332–335, 324/338–343

[56] References Cited

U.S. PATENT DOCUMENTS 4,077,003  2/1978  Rau ..................................... 324/338

Primary Examiner—Reinhard J. Eisenzopf
Assistant Examiner—Walter E. Snow
Attorney, Agent, or Firm—Robert A. Kulason; James J. O'Loughlin; Ronald G. Gillespie

[57] ABSTRACT

The present invention is a well logging method for determining the water saturation of an earth formation and the water's resistivity. Electromagnetic energy is transmitted into the earthen formation from a borehole traversing the earth formation. The electromagnetic energy is transmitted at two different frequencies within a range of frequency from 10 MHz to 200 MHz. Electromagnetic energies are received in the borehole from the earth formation. A phase difference and amplitude ratio for each transmitting frequency is derived from the received electromagnetic energy. The water resistivity and water saturation of the earth formation are derived from the derived phase differences and the amplitude ratios.

5 Claims, 2 Drawing Figures

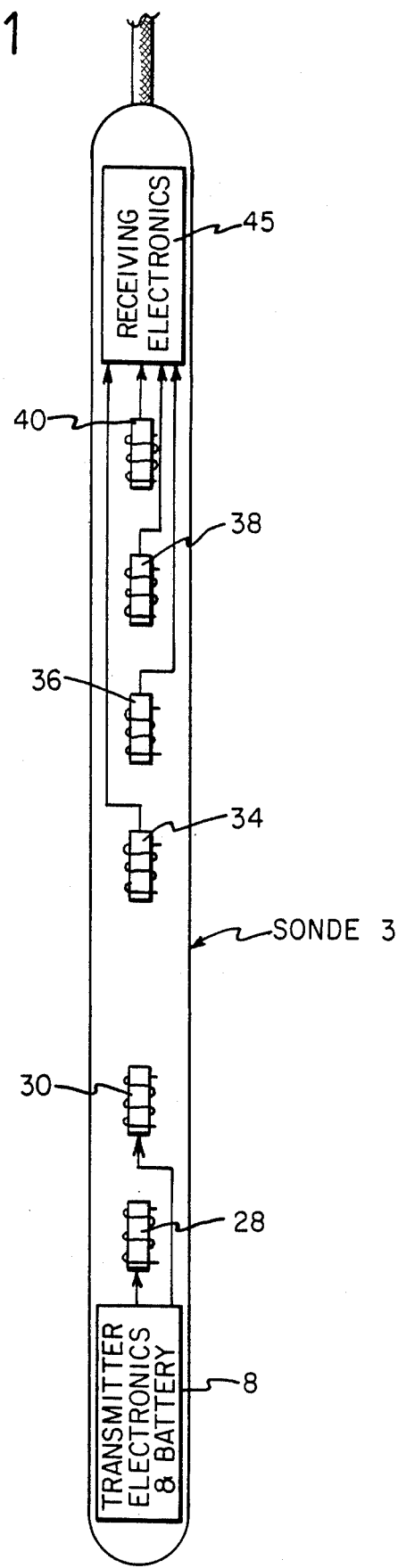

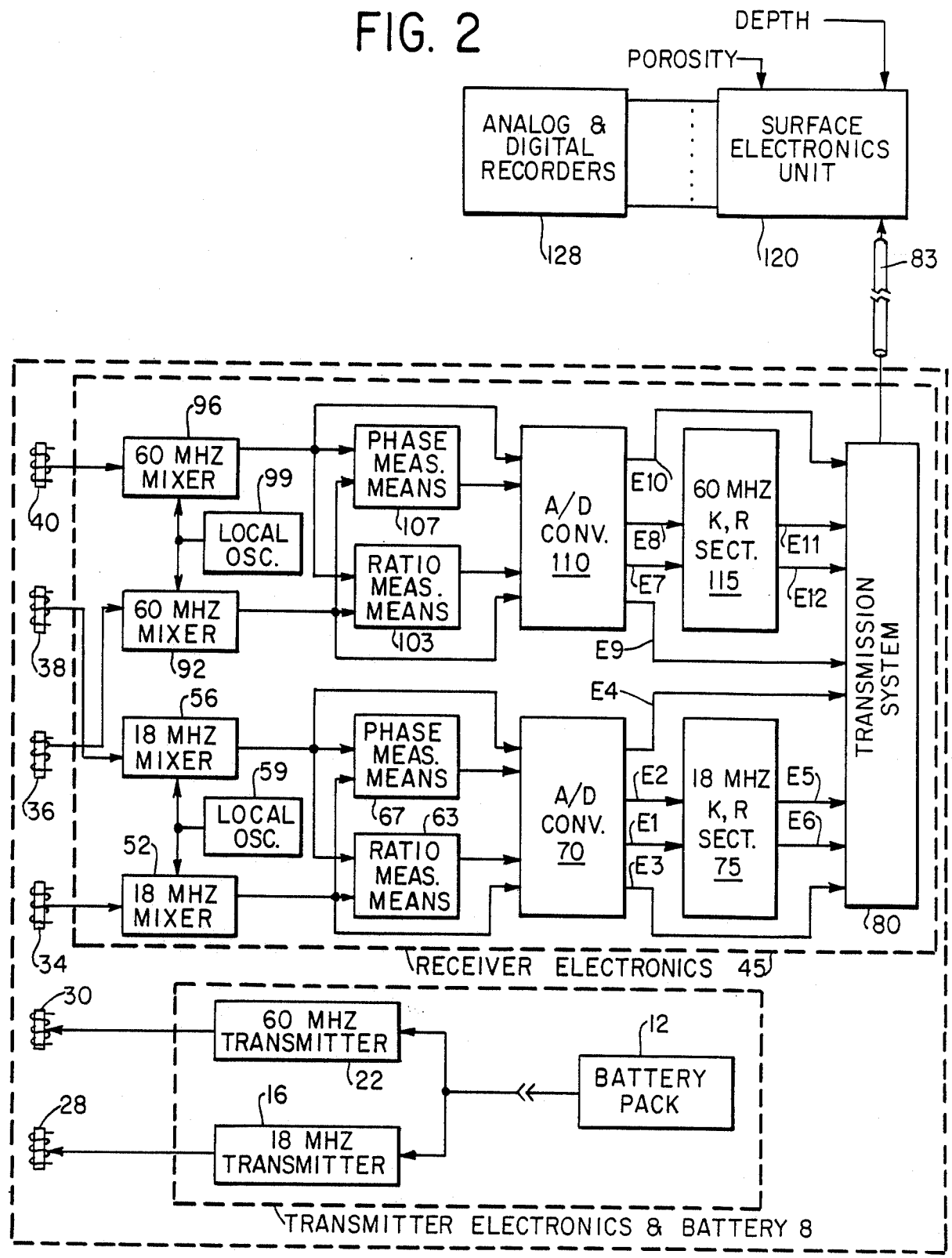

DUAL FREQUENCY WELL LOGGING SYSTEM FOR DETERMINING THE WATER RESISTIVITY AND WATER SATURATION OF AN EARTH FORMATION

BACKGROUND OF THE INVENTION

Field of the Invention

The present invention relates to electrical well logging methods in general and, more particularly, to resistivity and dielectric constant well logging methods.

SUMMARY OF THE INVENTION

The present invention is a well logging method for determining the water saturation of an earth formation and the water's resistivity. Electromagnetic energy is transmitted into the earthen formation from a borehole traversing the earth formation. The electromagnetic energy is transmitted at two different frequencies within a range of frequency from 10 MHz to 200 MHz. Electromagnetic energies are received in the borehole from the earth formation. A phase difference and amplitude ratio for each transmitting frequency is derived from the received electromagnetic energy. The water resistivity and water saturation of the earth formation are derived from the derived phase differences and the amplitude ratios.

The objects and advantages of the invention will appear more fully hereinafter, from a consideration of the detailed description which follows, taken together with the accompanying drawings where one embodiment is illustrated by way of example. It should be expressly understood, however, that the drawings are for illustration purposes only and are not to be construed as defining the limits of the invention.

DESCRIPTION OF THE DRAWINGS

FIG. 1 shows a simplified diagram of a dual frequency well logging sonde.

FIG. 2 is a simplified block diagram of a dual frequency well logging system constructed in accordance with the present invention.

DESCRIPTION OF THE INVENTION

The present invention utilizes a new method for obtaining a more accurate value of water saturation ($S_w$) from high frequency electromagnetic measurements taken from within a wellbore.

Dielectric constant interpretation has previously made use of a modified mixing law relationship, the so-called Lichtenecker-Rother (L-R) equation. This equation which has been used extensively to determine $S_w$ from dielectric constant and porosity measurements, is shown in equation (1), $$S_w = [K^e - K_m^e - K_o^e]/\phi(K_w^e - K_o^e) \qquad (1)$$

where K is the measured dielectric constant, $K_m$ is the matrix dielectric constant, $K_o$ is the oil dielectric constant, $K_w$ is the water dielectric constant, $\phi$ is the measured porosity, e is the cementation factor.

In very fresh formations, i.e., low conductivity, this equation returns accurate $S_w$ values for measured dielectric constant and porosity and known values of matrix, oil and water dielectric constants.

It has been known for some time that this interpretation is very sensitive to conductivity and several techniques have been tried to account for the salinity effect. The most useful technique was to attach a "polarization factor", p, as an exponent on the water dielectric constant term. The value of p was chosen to yield $S_w = 100\%$ in known water-filled sands. The assumption was then made that all the other sands contained waters of approximately the same salinity. This assumption, however, does not hold in many reservoirs, such as where fresh water flooding is employed and the injected water commingles with more saline connate water.

A more reliable interpretation technique has been recently discovered which eliminates formation water resistivity ($R_w$) as a variable in the $S_w$ equation. The new method was developed by expanding the L-R equation (1) to include conductivity effects in the measured dielectric constant (K) and water dielectric constant ($K_w$) terms. Substituting complex dielectric constants for K and $K_w$, equation (1) becomes:

$$S_w = [(K+jC)^e - K_m^e + \phi(K_m^e - K_o^e)]/\phi[(K_w+jC_w)^e - K_o^e] \qquad (2)$$

where C is proportional to the measured conductivity and $C_w$ is proportional to the formation water conductivity. This equation assumes the conductivity of the oil and matrix terms is equal to zero.

Applying standard mathematics techniques to the above equation allows it to be divided into real and imaginary parts. From the rear part of the equation, water saturation becomes $$S_w = [K_e - K_m^e + \phi(K_m^e - K_o^e)]/\phi(K_{we} - K_o^e) \qquad (3)$$

where $$K_e = (K^2 + C^2)^{e/2} \cos(e \tan^{-1}(C/K)) \qquad (4)$$

$$K_{we} = (K_w^2 + C_w^2)^{e/2} \cos(e \tan^{-1}(C_w/K_w)) \qquad (5)$$

$$C = 1/(2\pi f \epsilon_o R) \qquad (6)$$

$$C_w = 1/(2\pi f \epsilon_o R_w) \qquad (7)$$

where f is the frequency in hertz, $\epsilon_o$ is the free space dielectric value $= 8.85 \times 10^{-12}$, R is the measured resistivity in ohm-meters and $R_w$ is the formation water resistivity in ohm-meters.

The present invnetion makes use of equation (3) which was derived from the real part of the complex L-R equation. All quantities in equation (3) are either known or can be measured except for $S_w$ and $R_w$. The following procedure is used to solve for both $S_w$ and $R_w$:

(1) Measurements of R and K are made at two frequencies, for example 18 and 60 megahertz.

(2) Equation (3) using the 18 megahertz values of R and K and equation (3) using the 60 megahertz values of R and K are both solved for $S_w$ beginning with a high value of $R_w$.

(3) When the difference $S_{w18} - S_{w60}$ is greater than zero, the value of $R_w$ is lowered and the difference is again evaluated. This iterative process continues until the difference is substantially zero. The $S_w$ and $R_w$ values at this point are the solution to the two simultaneous equations.

The technique of the present invention may be extended to include shale effects by including a shale term in the derivation of equation (3). By considering shale be dispersed and as occupying a fraction of the available porosity, equation (3) takes on the form:

$$S_w = [K_e - K_m^e + \phi(K_m^e - K_o^e) - \phi V_{sh}(K_{se} - K_o^e)]/\phi(1 - V_{sh})(K_{we} - K_o^e) \quad (8)$$

where $$K_{se} = (K_{sh}^2 + C_{sh}^2)^{e/2} \cos(e \tan^{-1}(C_{sh}/K_{sh})) \quad (9)$$

and $$C_{sh} = 1/(2\pi f \epsilon_o R_{sh}) \quad (10)$$

Including shale effects in the interpretation requires knowledge of the shale dielectric constant ($K_{sh}$), shale resistivity ($R_{sh}$) and shale volume ($V_{sh}$). Values of $K_{sh}$ and $R_{sh}$ may be determined by making laboratory measurements on shale samples from the formations of interest. A value of $V_{sh}$ can be input into equation (8) from standard calculations using neutron-density log data. Equation (8) can then be solved using the previously described iterative process. This technique could be the basis for a new shaly sand interpretation.

The above technique can be applied to field measurements by obtaining dielectric constant and resistivity data at two different frequencies.

With reference to FIGS. 1 and 2 there is shown a dual frequency logging system which may be utilized in practicing the present invention. A sonde 3 includes a transmitter electronic section and batteries 8. Transmitter electronics and battery 8 includes a battery pack 12 providing energy to an 18 megahertz transmitter and a 60 megahertz transmitter which in turn causes transmitter coils 28 and 30 to transmit electromagnetic energy into the earth formation at 18 and 60 megahertz, respectively. Located within sonde 3 are receiver coils receiving electromagnetic energy from the earth formation and providing it to receiver electronics 45. The spacing of coils 28, 30, 34, 36, 38 and 40 is as follows: from mid-point to mid-point there is 24 inches between coil 28 and coil 34. There is 8 inches between mid-points of coils 34 and 36, 36 and 38, and 38 and 40. Further, the spacing between mid-point of coil 30 and mid-point of coil 36 is 24 inches, so that for all intents and purposes the spacings between transmitter coil and receiver coils are the same for each frequency, that is, 24 inches from mid-point of the transmitter coil to mid-point of the near receiver coil and 16 inches from the mid-point of the near receiver coil to the mid-point of the far receiver coil.

Coils 34 and 38 provide their signals representative of the received electromagnetic energy to 18 megahertz mixers 52 and 56, respectively which also receives a local oscillator signal from local oscillator 59. Mixers 52 and 56 provide signals to ratio measuring means 63, to phase measuring means 67 and to A/D converter means 70. A/D converter means 70 converts the analog signals to digital signals and provides them as digitial signals E1 and E2 corresponding to the ratio and phase, respectively, to K,R electronic section 75. K, R electronic section 75 may be a memory containing look-up tables of data derived from the aforementioned equations or it could be a microprocessor programmed to solve the aforementioned equations. In either case K, R section 75 provides signals E5 and E6 representative of K and R, respectively, in accordance with the ratio signal E1 and a phase signal E2 for 18 MHz. Digital signals E3 and E4 correspond to the amplitude of the signal provided by receiver coil 34 and receiver coil 38, respectively to the transmission system 80 which transmits uphole by way of a conventional logging cable 83.

Similarly, receiver coils 36 and 40 provide signals to 60 megahertz mixers 92 and 96, respectively which also receive a local oscillator signal from local oscillator 99. Mixers 92 and 96 provide their outputs to ratio measuring means 103, phase measuring means 107, and A/D converter means 110. Ratio measuring means 103 and phase measuring means 107 provides analog signals corresponding to the ratio of the amplitudes of the signals provided by receiver coils 36 and 40 and to the phase difference between those signals, respectively to A/D converter 110. A/D converter 110 provides digital signals E7 and E8 corresponding to the phase difference and to the amplitude ratio, respectively, to 60 megahertz K,R electronic switch 115. K,R section 115 is similar to K,R section 75 and provides signals relating to K and R for 60 MHz to transmission system 80 which transmits them uphole by way of logging cable 83.

At the surface, surface electronics unit 120 receives the K and R signals E5, E6, E11 and E12 and signals corresponding to the depth of the well logging sonde and to the porosity of the formation. Similar to the K,R sections 75 and 115, surface electronics unit 120 may include look-up tables derived from the aforementioned equations or it may be a microprocessor programmed to provide signals corresponding to the water saturation $S_w$ and the resistivity $R_w$ of the formation water according to the procedure previously set forth for the utilization of equation 3. Surface electronics unit 120 provides signals to analog and digital recorders 128.

What is claimed is:

1. A well logging method for determining the water resistivity and the water saturation in an earth formation comprising:

obtaining the porosity of the earth formation, transmitting electromagnetic energy at two different frequencies, lying within a range of frequencies from 10 MHz to 200 MHz, into the earth formation from a borehole traversing the earth formation, receiving electromagnetic energy in the borehole from the earth formation, deriving a phase difference and an amplitude ratio for each transmitting frequency from the received electromagnetic energies, and deriving the water resistivity and the water saturation of the earth formation from the derived phase differences and the amplitude ratio, the porosity of the earth formation and in accordance with the real portion of the Lichtenecker-Rother equation.

2. A method as described in claim 1 in which the deriving the water resistivity and the water saturation step includes:

determining a dielectric constant for a first transmitted frequency in accordance with the derived phase difference and the derived amplitude ratio for that frequency, determining a resistivity for the first transmitted frequency in accordance with the derived phase difference and the derived amplitude ratio for the first transmitted frequency, determining a dielectric constant for the other transmitted frequency in accordance with the derived phase difference and the derived amplitude ratio for the other transmitted frequency, and determining a resistivity for the other transmitted frequency in accordance with the derived phase difference and the derived amplitude ratio for the other transmitted frequency.

3. A well logging method as described in claim 2 in which the deriving the water resistivity and the water saturation step is done in accordance with the derived dielectric constants and the derived resistivities.

4. A well logging method as described in claim 3 in which the derived dielectric constant steps include:
providing a dielectric constant for a shale formation, and
providing a signal representative the volume of the shale formation; and the water resistivity and water saturation step is done in accordance with the derived dielectric constants, the derived resistivities, the shale formation dielectric constant and the shale formation volume.

5. A well logging system for determining the water resistivity and the water saturation in an earth formation traversed by a borehole, a well logging sonde including:
first transmitter means for transmitting electromagnetic energy at a first frequency, lying within the range of frequencies from 10 MHz to 200 MHz into the earth formation,
second transmitter means for transmitting electromagnetic energy at a second frequency, lying within the range of frequencies from 10 MHz to 200 MHz into the earth formation,
a first pair of receiver means spatially related to the first transmitter means for receiving electromagnetic energy from the earth formation and providing signals representative thereof,
a second pair of receiver means spaced a predetermined distance apart and spatially related to the second transmitter means for providing signals representative of electromagnetic energy received from the earth formation,
first signal means for providing signals relating to the electromagnetic energy transmitted by the first transmitter means and received by the first pair of receiver means,
first parameter means connected to the first signal means for providing signals corresponding to the phase difference between the signals provided by the pair of receiver means and for providing a first ratio signal corresponding to the ratio of the amplitudes of the signals provided by the first pair of receiver means,
second signal means connected to the second pair of receiver means for providing signals representative of the electromagnetic energies received by the second pair of receiving means,
second parameter signal means connected to the second signal means for providing a second phase difference signal corresponding to the phase difference between the signals provided by the second signal means and providing a ratio signal corresponding to the ratio of the amplitudes of the signals provided by the second signal means,
first means connected to the first parameter signal means for deriving a dielectric constant and a resistivity in accordance with the phase difference signal and a the ratio signal from the first parameter signal means,
second means connected to the second parameter signal means for deriving a dielectric constant and a resistivity in accordance with the phase difference signal and the ratio signal from the second parameter signal means;
means for transmitting the dielectric constant signals and the resistivity signals to the surface; and
surface signal processing means including:
means for providing a signal corresponding to porosity, and
means connected to the porosity signal means and to the transmission means for deriving the water saturation and the resistivity of the water in the earth formation in accordance with both phase difference signals and both dielectric constant signals and the porosity signal.

* * * * *